(12) United States Patent
Siracusano et al.

(10) Patent No.: US 11,075,849 B2
(45) Date of Patent: Jul. 27, 2021

(54) METHOD AND SYSTEM FOR PREVENTIVE FILTERING OF NETWORK TRAFFIC

(71) Applicant: NEC Laboratories Europe GmbH, Heidelberg (DE)

(72) Inventors: Giuseppe Siracusano, Heidelberg (DE); Roberto Bifulco, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 204 days.

(21) Appl. No.: 16/282,364

(22) Filed: Feb. 22, 2019

(65) Prior Publication Data

US 2020/0274821 A1 Aug. 27, 2020

(51) Int. Cl.
| H04L 12/911 | (2013.01) |
| H04L 12/26 | (2006.01) |
| H04L 12/24 | (2006.01) |
| H04L 29/06 | (2006.01) |

(52) U.S. Cl.
CPC .............. H04L 47/70 (2013.01); H04L 41/12 (2013.01); H04L 43/04 (2013.01); H04L 63/0236 (2013.01)

(58) Field of Classification Search
CPC .............. H04L 63/1433; H04L 63/1425; H04L 63/168; H04L 43/04; H04L 47/70; H04L 63/0236; H04L 63/101; H04L 41/142; H04L 41/16; H04L 61/1511; H04L 63/10; H04L 41/0816; H04L 63/1458; H04L 43/0817; G06N 3/088; G06N 3/0454; G06N 3/084
See application file for complete search history.

(56) References Cited

U.S. PATENT DOCUMENTS

| 10,104,113 | B1 | 10/2018 | Stein et al. |
| 2018/0375896 | A1* | 12/2018 | Wang ..................... G06F 21/566 |
| 2019/0273510 | A1* | 9/2019 | Elkind ...................... G06F 8/74 |
| 2020/0044931 | A1* | 2/2020 | Boon .................... H04L 43/028 |
| 2020/0195669 | A1* | 6/2020 | Karasaridis ......... H04L 63/1425 |

* cited by examiner

Primary Examiner — Oussama Roudani
(74) Attorney, Agent, or Firm — Leydig, Voit & Mayer, Ltd.

(57) ABSTRACT

A method for classifying network traffic data includes: selecting a subset of network destinations from the network traffic data to be evaluated to determine whether to classify the subset of network destinations with a common classification label, the common classification label corresponding to a common classification class; determining a list of vector representations for the subset of the network destinations contained in the network traffic data and a vector representation for the common classification label; computing a distance between a vector representation for a network domain and the vector representation of the classification label, the vector representation for the network domain being determined from the list of vector representations; classifying the subset of the network destinations as belonging to the common classification class based on the distance being less than a predefined threshold.

20 Claims, 5 Drawing Sheets

METHOD AND SYSTEM FOR PREVENTIVE FILTERING OF NETWORK TRAFFIC

FIELD

The present invention relates to a method and system for preventive filtering of network traffic.

BACKGROUND

The modern hyper-connected society depends on reliable and secure network communications. Unfortunately, the pervasive presence of connected devices exposes new categories of network users to network threats. For instance, home users and small enterprises—in the past less concerned with network security issues—are increasingly becoming preferred targets of network attacks. In fact, their network infrastructure is usually less protected lacking a dedicated expert team that maintains it.

Network operators can play an important role in defending such users from malicious network traffic because, for example, network operators have access to important vantage points, such as the users' uplinks to the global Internet. However, a network operator's ability to provide such defense can be limited by the other factors. For example, the encryption and size of network traffic inhibits the network operators from applying advanced traffic analysis because such analysis would require processing power in excess of what is usually economically viable. As a result, less sophisticated blacklist filtering is generally applied.

Unfortunately, blacklist filtering has several significant drawbacks. For example, blacklist filtering can only detect traffic directed towards destinations (e.g., network domains) that are a priori known as malicious. Also, updating a blacklist is a long process, with known malicious domain entries being added to a blacklist only after considerable time after they are discovered. As such, blacklist filtering often provides ineffective protection. Failing to protect the large audience of home users and small enterprises, however, entails serious risks for all the connected critical infrastructures, as it enables attackers at leveraging a vast amount of cheap resources.

SUMMARY

An embodiment of the present invention provides a method for classifying network traffic data. The method includes: selecting a subset of network destinations from the network traffic data to be evaluated to determine whether to classify the subset of network destinations with a common classification label, the common classification label corresponding to a common classification class; determining a list of vector representations for the subset of the network destinations contained in the network traffic data and a vector representation for the common classification label; computing a distance between a vector representation for a network domain and the vector representation of the classification label, the vector representation for the network domain being determined from the list of vector representations; and classifying the subset of the network destinations as belonging to the common classification class based on the distance being less than a predefined threshold.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
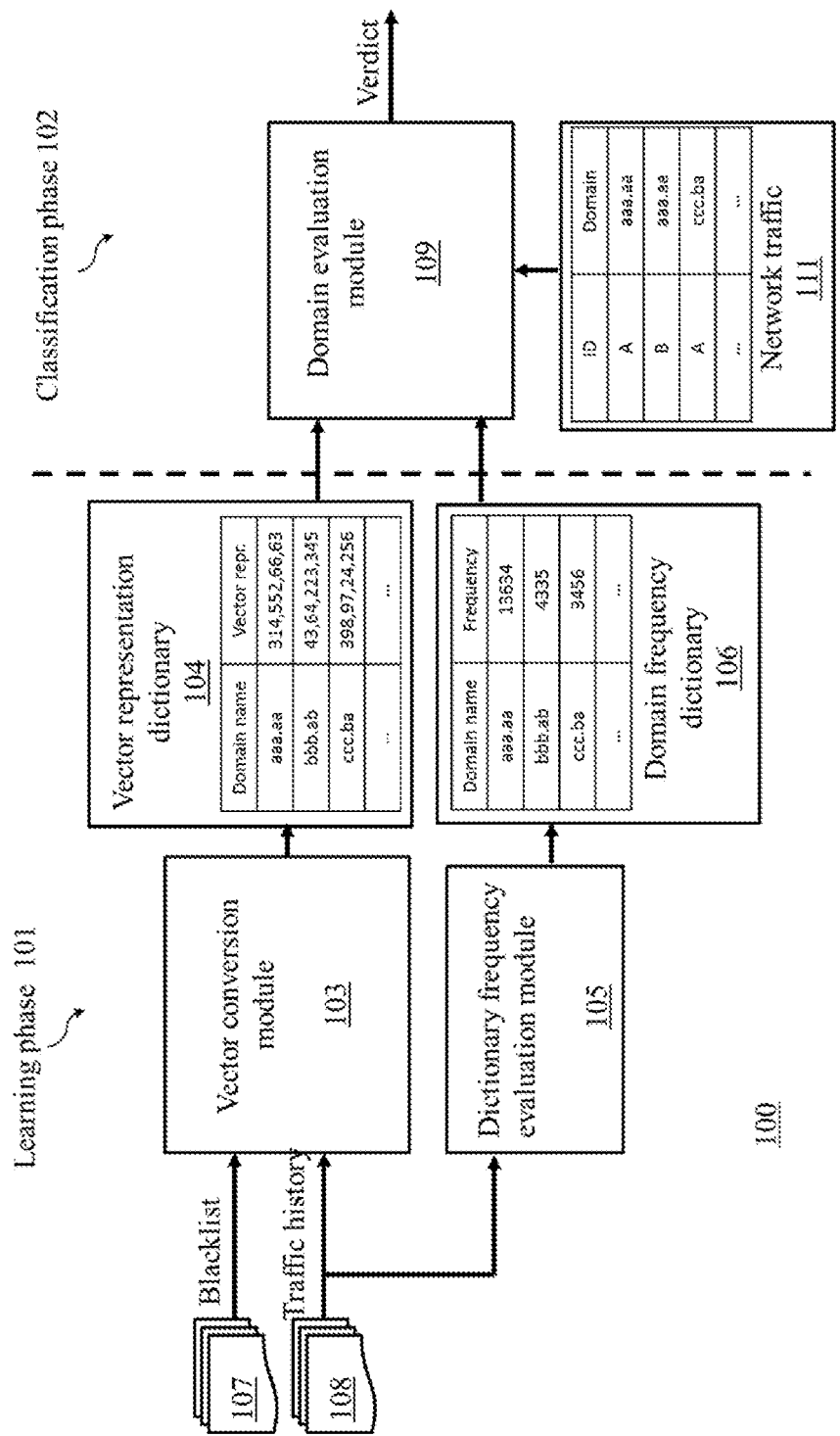
FIG. 1 illustrates an embodiment of a preventive filtering system according to the present invention.

Embodiments of the present invention provide methods to perform preventive filtering of network traffic, including by identifying unknown malicious network flows (e.g., in a in high-performance network) using a history of visited domain names to define a network flow's context, and thereby classify its potential maliciousness.

The present invention addresses problems that state-of-the-art systems have with adequately defending network infrastructures (e.g., a home network) by monitoring the network traffic sent and received by the infrastructure and employing a classification mechanism to predict whether or not the network traffic is dangerous. In a preferred embodiment, the network traffic is monitored at the connection link of the infrastructure to the Internet. The network traffic can be monitored to capture a sequence of visited network domains for each infrastructure's entity. Examples of entities of an infrastructure include a laptop, a mobile phone, an IoT device, a software program running on a laptop, etc.

According to an embodiment, an entity's network flow is classified as either "normal" or "dangerous" by employing a classification method that learns a model for "dangerous" traffic from historical data. For example, a machine learning classification model may be trained using historical network traffic data and a list of known malicious network domains to create a classification model that can determine normal and dangerous network traffic. Other embodiments, however, classify other categories of network flows (e.g., high priority).

Embodiments can implement the trained classification model to enable the system to classify large amounts of network traffic efficiently.

Embodiments of the present invention may operate in two phases. A first phase—generally called a learning phase—which happens off-line and may be repeated (e.g., periodically or occasionally), where classification models are generated and/or updated. A second phase—generally called a classification phase—which happens on-line, where the network traffic is classified in real-time to identify "dangerous" network flows.

Embodiments of the present invention provide a system and method for classifying data flows of a network. To enable such classification, embodiments build, in the learning phase, a vector representation model based on a set of domain names. The set of domain names may be built from a set of historical network traffic data. Embodiments build the vector representation model by first selecting a subset from the set of domain names based on a list of a predefined class of domain names. This list of domain names may be a blacklist with entries of known malicious domains, but other lists of a known class of domain names may also be used. Embodiments then substitute the selected subset of domain names with a common label to modify the set of domain names. Using the new, modified set of domain names, embodiments build a model to represent the domain names (which now include the common label) in vector space—a vector space model.

A vector representation look-up table may also be built (e.g., built during the learning phase) based on the vector space model. For example, embodiments may generate a look-up table that associates domain names from the set of domain names with their vector representations from the vector space model. The look-up table may also include the same vector representation value computed for the common label for all of the substituted subset of domain names.

Embodiments may also determine the frequency that each domain name appears in the set of domain names. This may also be done in the learning phase.

In the classification phase, embodiments receive live network traffic data for evaluation. For example, a sequence of domain names may be received for evaluation. For each of the sequence of domains, embodiments determine the corresponding vector from the vector space model. A single vector may then be computed as the average vector of the vectors corresponding to the sequence of domains.

This computed single vector for the sequence of domains can then be used to compute a distance in vector space from the vector representation of the common label. This distance value can then be used to classify the sequence of domains. For example, the distance may be compared against a predetermined threshold value to make a binary classification (e.g., a GOOD vs a BAD domain).

In an embodiment, prior to computing the single vector, the appearance frequency for a domain in the sequence of domains can be checked to determine whether or not it meets a predefined threshold. If the frequency does not meet this threshold, then the vector representation of that domain is not used in calculating the single vector.

According to a preferred embodiment, historical network traffic data is collected at a network infrastructure's target monitoring point. The network traffic being classified in the classification phase may be collected at the same, or similar, monitoring point.

An embodiment of the present invention provides a method for classifying network traffic data. The method includes: selecting a subset of network destinations from the network traffic data to be evaluated to determine whether to classify the subset of network destinations with a common classification label, the common classification label corresponding to a common classification class; determining a list of vector representations for the subset of the network destinations contained in the network traffic data and a vector representation for the common classification label; computing a distance between a vector representation for a network domain and the vector representation of the classification label, the vector representation for the network domain being determined from the list of vector representations; and classifying the subset of the network destinations as belonging to the common classification class based on the distance being less than a predefined threshold.

The method may further include outputting a warning based on the subset of the network destinations being classified as belonging to the common classification class. Also, the method may further include applying a filter to block the subset of the network destinations' network traffic data based on the subset of the network destinations being classified as belonging to the common classification class.

In an embodiment, the common classification class groups network destinations in the form of networks domain names. The subset of the network destinations can correspond to a particular network entity.

In an embodiment, determining the list of vector representations corresponding to the subset of the network traffic destinations includes: generating a comparison list comprising domain name information corresponding to the particular network entity based on the network traffic data; generating a modified comparison list by inserting a vector representation value for each entry in the comparison list that has a corresponding domain name entry in a vector representation dictionary, the vector representation value being that associated with the corresponding domain name entry; and generating the list of vector representations by removing entries from the modified comparison list that do not have a corresponding domain name entry in the vector representation dictionary. The vector representation for the network domain can be determined as an average of vector representations values in the list of vector representations.

The method may further include, before determining the vector representation for the network domain, removing from the list of vector representations entries having a corresponding domain name that does not meet a threshold frequency level, the corresponding domain name's frequency being determined from the historical network traffic data.

In an embodiment, the method further includes generating a vector representation dictionary based on the historical network traffic data and the list of domain names having the common classification class. Entries in the vector representation dictionary may each include element information and a vector representation, the element information comprising a domain name or the classification label.

The vector representation can be a set of numeric values that represent a projection of a domain name in a feature space. In an embodiment, the vector representation can be learned with a skip-gram model. The method may also further include: generating a list of unique domain names from historical network data; generating a bad domain list based on entries in the list of unique domains that correspond to entries in a blacklist; generating a modified list of unique domain names based on replacing each of the domain names in the list of unique domain names that correspond to at least one of the entries in the blacklist with the classification label; and learning vector representations for each entry in the modified list of unique domain names, the vector representations comprising the vector representation of the classification label. Generating the vector representation dictionary may include: individually associating each entry in the modified list of unique domain names with a corresponding one of the vector representations; and individually associating each entry in the bad domain list with the vector representation of the classification label.

In another embodiment, a network monitoring system for filtering network traffic data is provided. The network monitoring system includes a domain evaluation module configured to: select a subset of network destinations from the network traffic data to be evaluated to determine whether to classify the subset of network destinations with a common classification label, the common classification label corresponding to a common classification class; determine a list of vector representations for the subset of the network destinations contained in the network traffic data and a vector representation for the common classification label;

compute a distance between a vector representation for a network domain and the vector representation of the classification label, the vector representation for the network domain being determined from the list of vector representations; classify the subset of the network destinations as belonging to the common classification class based on the distance being less than a predefined threshold; and send a classification notification about the subset of the network traffic destinations.

The network monitoring system may further include: a network gateway in communication with the domain evaluation module, the network gateway being configured to route the network traffic data in a network and being configured to filter network traffic from the subset of the network destinations based on receiving the classification notification; and a probe in communication with the network gateway and the domain evaluation module, the probe being configured to capture the network traffic data for use by the domain evaluation module.

In an embodiment, the subset of network destinations corresponds to a particular network entity. Also, the domain evaluation module may be configured to determine the list of vector representations corresponding to the subset of the network destinations by: generating a comparison list comprising domain name information corresponding to the particular network entity based on the network traffic data, generating a modified comparison list by inserting a vector representation value for each entry in the comparison list that has a corresponding domain name entry in a vector representation dictionary, the vector representation value being that associated with the corresponding domain name entry, and generating the list of vector representations by removing entries from the modified comparison list that do not have a corresponding domain name entry in the vector representation dictionary. The vector representation for the network domain may be an average of vector representations values in the list of vector representations.

In an embodiment, the vector representation dictionary can be generated by: generating a list of unique domain names from historical network data; generating a bad domain list based on entries in the list of unique domains that correspond to entries in a blacklist; generating a modified list of unique domain names based on replacing each of the domain names in the list of unique domain names that correspond to at least one of the entries in the blacklist with the classification label; learning vector representations for each entry in the modified list of unique domain names, the vector representations comprising the vector representation of the classification label; individually associating each entry in the modified list of unique domain names with a corresponding one of the vector representations in the vector representation dictionary; and individually associating each entry in the bad domain list with the vector representation of the classification label in the vector representation dictionary.

Another embodiment provides a network monitoring system for filtering network traffic data, the network monitoring system having one or more processors in communication with a non-transitory processor-readable memory containing instructions, which when executed by the processor cause the network monitoring system to: select a subset of network destinations from the network traffic data to be evaluated to determine whether to classify the subset of network destinations with a common classification label, the common classification label corresponding to a common classification class; determine a list of vector representations for the subset of the network destinations contained in the network traffic data and a vector representation for the common classification label; compute a distance between a vector representation for a network domain and the vector representation of the classification label, the vector representation for the network domain being determined from the list of vector representations; classify the subset of the network destinations as belonging to the common classification class based on the distance being less than a predefined threshold; and send a classification notification about the subset of the network traffic destinations.

In an embodiment, the instructions, when executed by the processor, further cause the network monitoring system to: send the classification notification to a network gateway, which routes the network traffic data in a network and filters the network traffic from the subset of the network destinations based on the classification notification; and receive the network traffic data from a probe in communication with the network gateway, the probe being configured to capture the network traffic data.

The subset of network destinations may correspond to a particular network entity. Also, the instructions, when executed by the processor, may further cause the network monitoring system to determine the list of vector representations corresponding to the subset of the network destinations by: generating a comparison list comprising domain name information corresponding to the particular network entity based on the network traffic data, generating a modified comparison list by inserting a vector representation value for each entry in the comparison list that has a corresponding domain name entry in a vector representation dictionary, the vector representation value being that associated with the corresponding domain name entry, and generating the list of vector representations by removing entries from the modified comparison list that do not have a corresponding domain name entry in the vector representation dictionary. The vector representation for the network domain may be an average of vector representations values in the list of vector representations.

Another embodiment provides a non-transitory processor-readable storage medium storing instructions that upon execution cause a network monitoring system to perform a method to classify network traffic data, the method including: selecting a subset of network destinations from the network traffic data to be evaluated to determine whether to classify the subset of network destinations with a common classification label, the common classification label corresponding to a common classification class; determining a list of vector representations for the subset of the network destinations contained in the network traffic data and a vector representation for the common classification label; computing a distance between a vector representation for a network domain and the vector representation of the classification label, the vector representation for the network domain being determined from the list of vector representations; and classifying the subset of the network destinations as belonging to the common classification class based on the distance being less than a predefined threshold.

Embodiments of the present invention enable classification of malicious network data flows in live network traffic with scalability and speed comparable to those of blacklist-type systems, yet also overcoming limitations typical of such blacklist-type systems (e.g., inability to adapt quickly to a changing security landscape). Accordingly, embodiments of the present invention provide a more effective (e.g., higher accuracy) mechanism to filter live network traffic and provide an improvement to computer-based data security.

FIG. 1 illustrates an embodiment of a preventive filtering system according to the present invention. In FIG. 1, the system 100 is depicted with an indication of whether an element of the system 100 is utilized in the learning phase 101 and/or the classification phase 102 of its operation.

The system 100 includes a Vector Conversion Module (VCM) 103, a Vector Representation Dictionary 104, a Dictionary Frequency Evaluation Module (DFM) 105, and a Domain Frequency Dictionary 106, which are all used during the learning phase 101.

The VCM 103 computes the VRD 105. The VRD 104 can be a dictionary containing N tuples, where N is the number of distinct observed domains in the network traffic data. Each tuple can be, for example, in the form <domain name, vector representation>. The vector representation is a set of numeric values that represent a projection of the domain name in a feature space (e.g., a Euclidean space).

To compute the VRD 104, the VCM 103 takes a blacklist 107 and a set of historical network traffic data 108 as its inputs. The blacklist 107 may include a list of domains that are known to be malicious (or otherwise dangerous or banned from the network). In a preferred embodiment, the set of historical network traffic data 108 is relatively recent and contains network flows information about several network entities and for several days of monitoring. The actual amount of historical network traffic data and the time at which it is collected are, however, variable for the needs of the implementation.

According to an embodiment, as part of computing the VCM 103, the VRD 104 builds a list of unique domain names DL from the set of historical network traffic data 108.

The VCM 103 then compares the domains on the blacklist 107 with the list of unique domain names DL. If a domain appears in both of the blacklist 107 and the list of unique domain names DL, the VCM 103 adds this domain to a "bad" domains list BDL and replaces the corresponding domain name entry in the list of unique domain names DL with a new label L (e.g., "BAD"). If the domain does not appear in both of the blacklist 107 and the list of unique domain names DL, the VCM 103 does nothing with that entry. The VCM 103 will do this process for each of the domains on the blacklist 107.

The VCM 103 then uses the now modified list of unique domain names MDL—i.e., the unique list of domain names DL having its domains that appeared on the blacklist 107 replaced with the labels L—to learn representation vectors for each of the entries (e.g., domains or labels) in the modified list of unique domain names MDL, including the entries having the label L. The VCM 103 may use, for example, a skip-gram model (e.g., word2vec) to learn these representation vectors.

The VCM 103 then builds the VRD 104 entry for each of the learned representation vectors. For example, each VRD 104 entry can include a tuple of the form <domain name, vector representation>.

For each entry on the bad domains list BDL (e.g., a domain), the VCM 103 adds a new entry to the VRD 103. For example, the VCM 103 may add to the VRD 103 a new tuple in the form of <element, representation of L>—i.e., each domain in the bad domains list BDL is associated in the VRD 103 with the same vector representation learned for the label L.

Regarding the DFM 105, the DFM 105 takes as its input the historical network traffic data 108, and produces the DFD 106 as its output. In an embodiment, the DFD 106 contains tuples in the form <domain name, frequency>, where frequency is the relative (or absolute) number of occurrences of the domain name within the historical network traffic data set 108.

The VRD 104 and the DFD 106 are then used by the system 100 to classify network flows (e.g., network traffic data), e.g., to classify whether or not a particular network flow is dangerous.

As shown in FIG. 1, the VRD 104 and the DFD 106 are received by the Domain Evaluation Module (DEM) 109 of the system 100. According to an embodiment, the DEM 109 receives the VRD 104 from the VCM 103 and receives the DFD 106 from the DFM 105 at the end of a learning phase 101. The learning phase 101 may be variously performed, e.g., occasionally or periodically.

The DEM 109 is used by the system 100 in the classification phase 102 of its operation. For example, during the classification phase 102, the DEM 109 performs on-line network traffic classification. The DEM 109 takes as its inputs the VRD 104, the DFD 106, and logs of network traffic 110.

The logs of network traffic 110 may be received by the DEM 109 as tuples in the form <network entity id, domain name, timestamp>. The network entity id is an identifier of a network flow. For example, the network entity id may be a network IP address, a combination of IP address and source TCP/UDP port, a user identifier, etc. The domain name is the requested domain name contained in the identified network flow. The timestamp is the time at which the flow has been observed. According to an embodiment, the log of network traffic 100 represents tuples of live (e.g., real-time) network traffic. A network entity may be, for example, a host of domains.

In an embodiment, the DEM 109 provides as an output a binary classification of the flows in the logs of network traffic 110 (i.e., its verdict). For example, in a preferred embodiment, the DEM 109 may classify each of the network flows as either GOOD or BAD. This classification may be used by the system 100 to filter the network traffic.

According to an embodiment, as part of performing the classification of network flows, when the DEM 109 receives a new network traffic tuple—e.g., in the form of a triplet <network entity id, domain name, timestamp>—the DEM 109 adds the new network traffic tuple to a list of per-entity recently reviewed tuples RRT. In this way, each entity on the network (e.g., differentiated by network entity id) has its own RRT list.

The DEM 109 then performs a look-up in the DFD 106 for each entry of the RRT list to determine the corresponding DFD 106 entry (if any). As described above, the DFD 106 includes a relative number of occurrences a particular domain name appeared in the historical network traffic data set 108. Accordingly, by performing the look-up, the DFD 106 can determine a frequency value from the DFD 106 that is associated with the particular domain of the relevant entry on the RRT list.

The DEM 109 compares the relevant entry's frequency value with a threshold FTr. If the DEM 109 determines that the relevant entry's frequency value exceeds the threshold FTr, then the DEM 109 adds this entry (e.g., the domain name) 0 from the RRT to a comparison list C.

If, when the DEM 109 is performing the look-up in the DFD 106 for a particular entry of the RRT list, the DEM 109 determines that a corresponding entry is not in the DFD 106 (e.g., the corresponding domain name is not found in the DFD 106), this entry is skipped.

The DEM 109 also compares the entries in the comparison list C with the VRD 104. For each entry in the comparison list C, the DEM 109 performs a look-up in the VRD 104 for a corresponding entry. If the DEM 109 finds an entry in the VRD 104 that corresponds to the entry in the comparison list C, the DEM replaces the relevant entry (e.g., the domain name) in C with the corresponding value from the VRD 104 (e.g., the vector representation). If, however, the DEM 109 does not find a corresponding entry in the VRD 104, the relevant entry from the comparison list C is removed from the comparison list C.

Once the DEM 109 determines the modified comparison list MC—i.e., the list with entries replaced by corresponding values from the VRD 104 and entries pruned when no corresponding entry is present in the VRD 104, the DEM 109 uses the modified comparison list MC to determine an average value of all the vector representation values contained in the modified comparison list MC.

The DEM 109 uses the computed average vector representation value (a single vector representation) to determine a distance from the vector representation of the label L. If the distance is smaller than a distance threshold Dtr, then the corresponding network flow is classified as matching the classification label (e.g., BAD). Otherwise, the DEM 109 classifies the corresponding network flow as not belonging to the classification label (e.g., GOOD).

In an embodiment, the distance threshold Dtr is determined by verifying the false positive rate (i.e., good domains being classified as bad ones) and the false negative rate (i.e., bad domains being classified as good ones) on the used training data set, and then selecting a threshold value that gets closer to the target values for those rates. Such target values depend on the use case.

This determination may be used to filter network flows (e.g., prevent data streams from a particular source) and/or to provide enhanced security.

Figure 2:
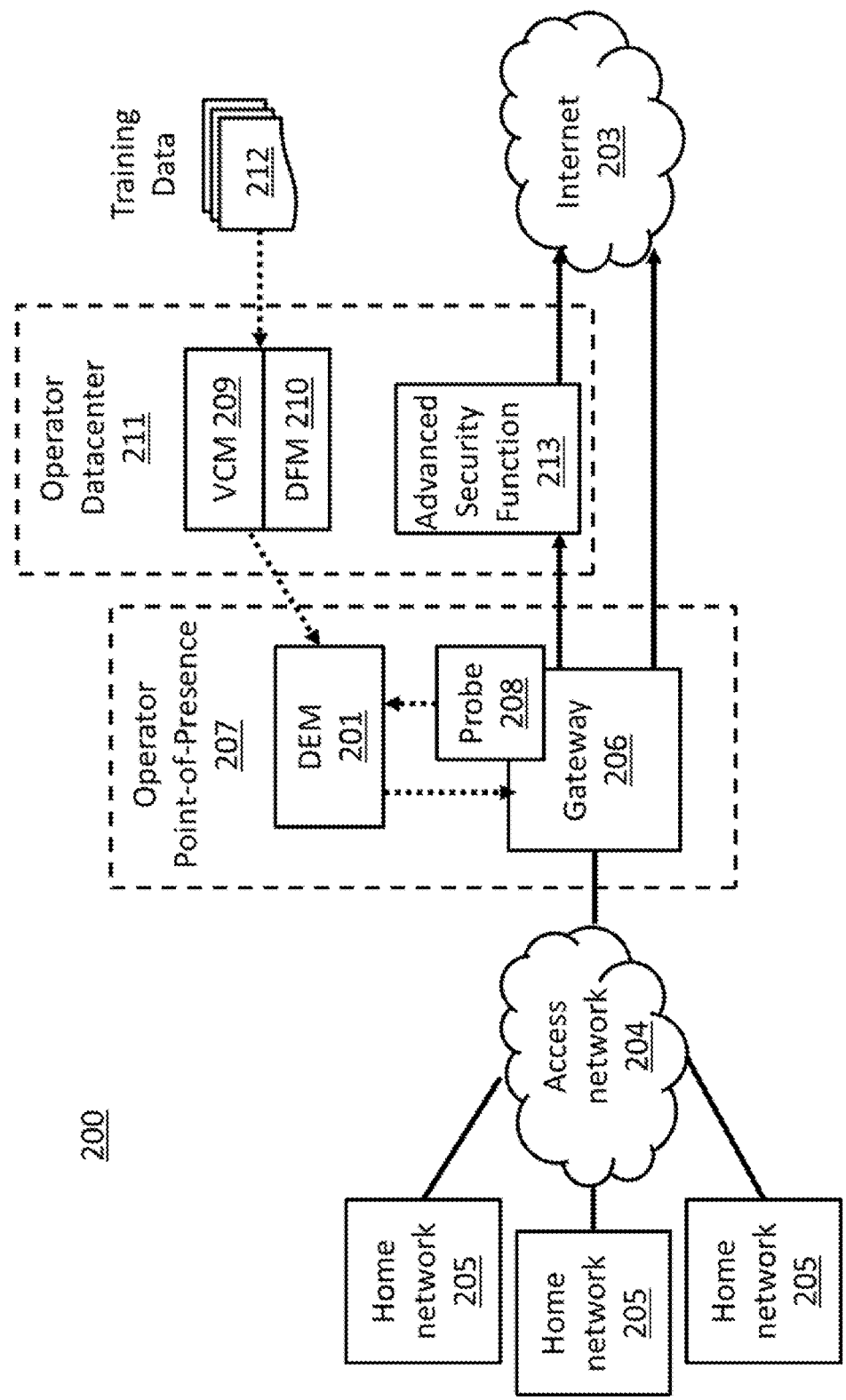
FIG. 2 illustrates an embodiment of a network monitoring system according to the present invention.

FIG. 2 illustrates an example embodiment of a telecommunication operator network monitoring system 200 (e.g., for broadband networks) according to the present invention. The network monitoring system 200 of FIG. 2 may be operated by a network operator (e.g., a telecommunication operator) in order to perform preventative filtering of network data.

The network operator can deploy a preventive filtering system (such as preventative filtering system 100 described above). For example, the network operator may deploy a preventative filtering system using a Domain Evaluation Module (DEM) 201—e.g., DEM 109 discussed above—to classify dangerous flows in a monitored network using a Vector Representation Dictionary (VRD) and Domain Frequency Dictionary (DFD)—e.g., VRD 104 and DFD 106 discussed above.

In FIG. 2, the monitored network includes the internet 203 and an access network 204, the access network 204 including home networks 205. As such, the preventative filtering system of the network monitoring system 200 can filter dangerous network flows within the monitored network (e.g., between a home network 205 and the internet 203).

The DEM 201 can be collocated with a broadband access gateway 206 (e.g., a BRAS or BNG) or other network gateway (e.g., a firewall or router). For example, as shown in the embodiment illustrated in FIG. 2, the DEM 201 is collocated with the broadband access gateway 206 in an edge Point-of-Presence (PoP) 207. The PoP 207 may be part of the operator's access network and/or metropolitan area network. The broadband access gateway 206 can receive a notification from the DEM 201 signaling that a particular network flow, domain, host, network entity, etc. is dangerous, and take action based on that notification. For example, the broadband access gateway 206 may filter all flows that it has been notified as dangerous from continuing in the network.

A network probe 208 can also be deployed with the DEM 201 and broadband access gateway 206 (e.g., at the PoP 207). The network probe 208 can capture the live network traffic data for use by the DEM 201. The DEM 201 can classify the live network traffic data (e.g., as either GOOD or BAD).

The VRD and DFD may be provided from a Vector Conversion Module (VCM) 209 and Dictionary Frequency Evaluation Module (DFM) 210, respectively (e.g., sent via a communication). The VCM 209 and DFM 210 may be implemented in one of the network operator's central datacenters 211 (e.g., where large storage and computation resources are available).

The network operator may provide training data 212 (e.g., historical traffic traces and blacklists) to the VCM 209 and the DFM 210 to produce the VRD and DFD required by the DEM 201 to classify the network flows If the DEM 201 classifies a network flow as BAD, the DEM 201 can notify the broadband gateway 206 to take special actions with the network traffic. For example, the network flow could be forwarded to an advanced security function 213 for further analysis. The advanced security function 213 may be deployed at the operator's datacenter 211 where more resources for running such advanced functions may be available.

Figure 3:
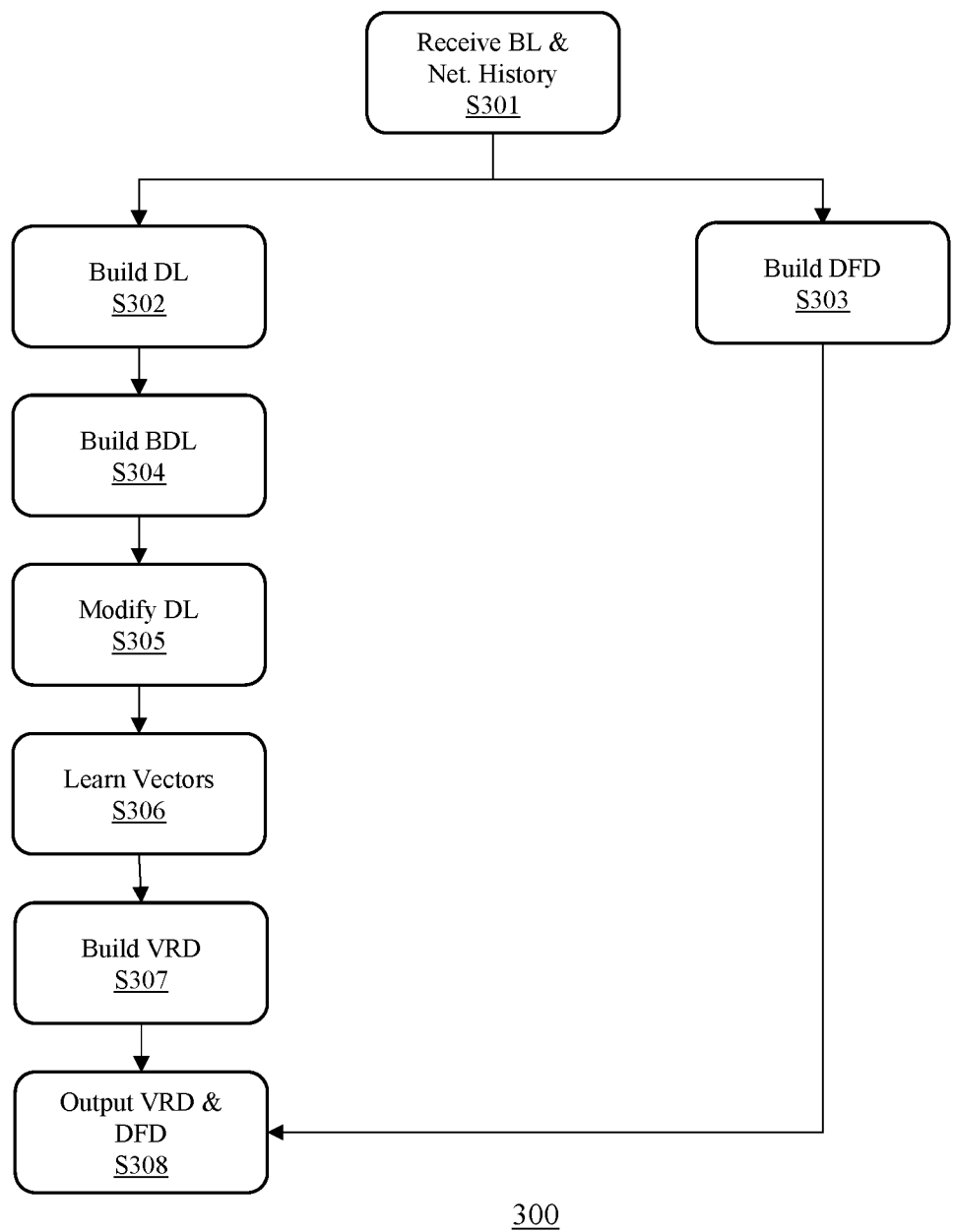
FIG. 3 illustrates a learning phase of a method according to an embodiment of the present invention.

FIG. 3 illustrates a learning phase 300 of a method according to an embodiment of the present invention.

At the beginning of the learning phase 300, a blacklist (or other domain classification list) and historical network traffic data are received (e.g., received by a vector conversion module) (S301).

A list of unique domain names DL is then built (e.g., built by a vector conversion module) from the historical network traffic data (S302). A domain frequency dictionary DFD is also built (e.g., built by a dictionary frequency evaluation module) from the historical network traffic data that associates each unique domain name with the frequency of its occurrence in the historical network traffic data (S303).

A bad domains list BDL is then built (e.g., built by the vector conversion module) by adding to it each domain entry that appears in both the list of unique domain names DL and the blacklist (S304). The unique domain names list DL is then modified such that each element in the unique domain names list DL that also appears in the bad domains list DBL is replaced by (e.g., replaced by the vector conversion module) a classification label L (e.g., "BAD") (S305).

The modified domain name list, which now contains domain names and the classification label L, is then used (e.g., used by the vector conversion module) to learn vector representations for each of its elements, including the classification label L (S306). A skip-gram model, (e.g., word2vec) can be used to perform the vector representation learning process.

For each learned vector representation, an entry is then created (e.g., created by the vector conversion module) in a vector representation dictionary VRD and associated with its corresponding element in the modified domain name list (e.g., a domain name or the classification label). Also, for each of the elements in the bad domain names list BDL, another entry is added (e.g., added by the vector conversion module) to the vector representation dictionary that associates each element with the learned vector representation of the classification label L. (S307).

The vector representation dictionary VRD and the domain frequency dictionary DFD can then be output for use in a classification phase (S308). The learning phase method 300 can be repeated periodically, occasionally as new network data is accumulated, and/or when a new blacklist is received.

Figure 4:
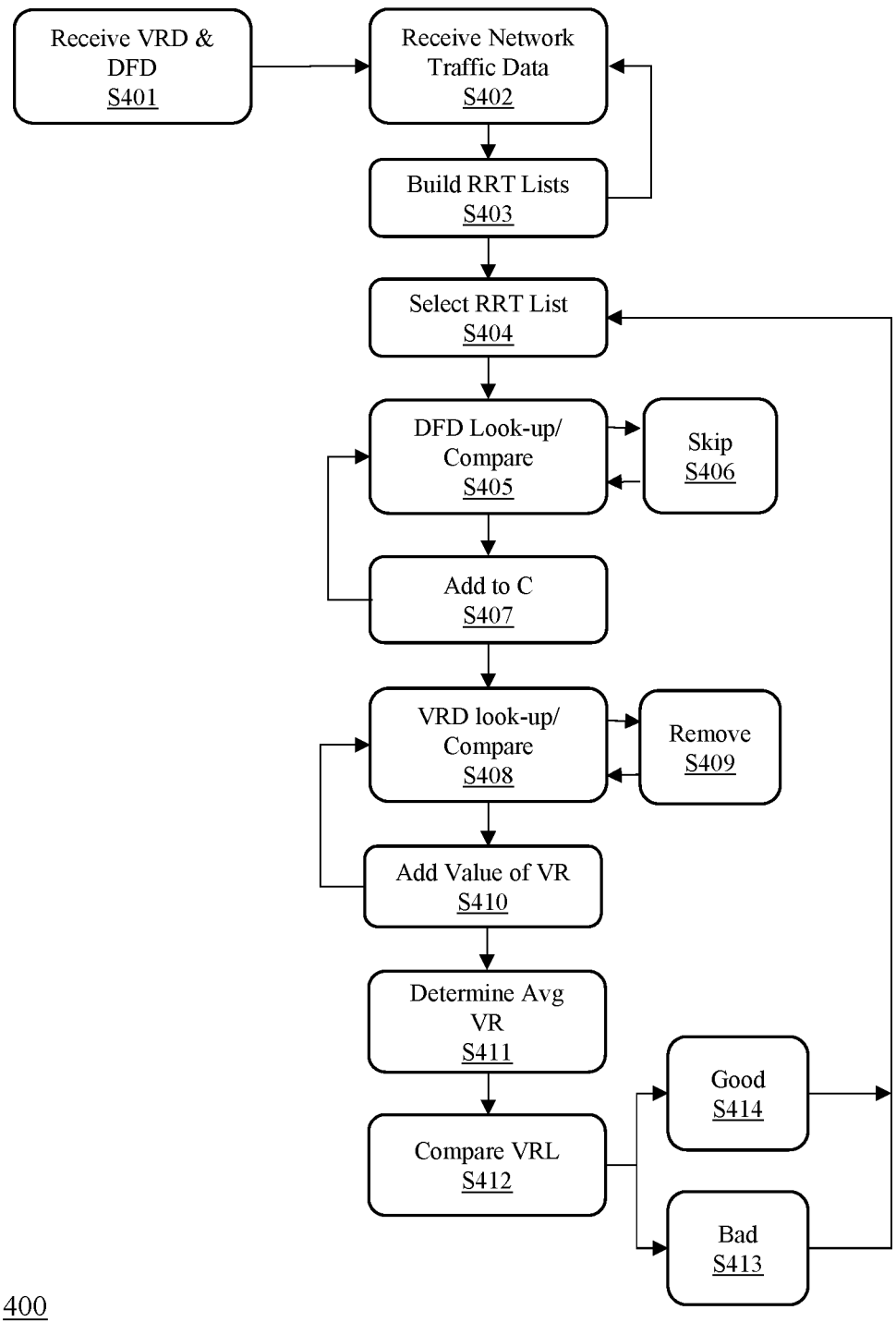
FIG. 4 illustrates a classification phase of a method according to an embodiment of the present invention.

FIG. 4 illustrates a classification phase 400 of a method according to an embodiment of the present invention.

As part of the classification phase 400, the vector representation dictionary VRD and the domain frequency dictionary DFD are received (e.g., received by a domain evaluation module) (S401). New and/or updated vector representation dictionaries and domain frequency dictionaries may be periodically or occasionally received.

Network traffic data (e.g., live or recent network traffic data) is received (e.g., received by the domain evaluation module) (S402). The network traffic data may be received as logs that include information on network traffic flows, for example identifying the associated originating network entity id, domain name, and a time stamp.

The network traffic data is then sorted (e.g., sorted by the domain evaluation module) into lists (S403). In the example embodiment of FIG. 4, each item of network traffic data is sorted into a per-entity recently received triplets RRT list (i.e., each unique network entity has its own list). The sorted network traffic data lists by be updated as more network traffic data is received.

The RRT lists are evaluated and classified individually. As such, one RRT list is selected (e.g., selected by the domain evaluation module) for evaluation (S404).

For each entry in the selected RRT list, a look-up is performed (e.g., performed by the domain evaluation module) in the domain frequency dictionary to determine its corresponding frequency, which is then compared against a frequency threshold (S405). If the frequency of the respective entry is not found or is less than the threshold, this entry is skipped (S406). If, however, the frequency of the respective entry is at or larger than the threshold, the entry is added (e.g., added by the domain evaluation module) to a comparison list C (S407). The look-up and skip/add processes are run until all entries in the selected RRT list have been looked-up in the domain frequency dictionary—after which, the comparison list C is complete.

For each entry in the comparison list C, a look-up is performed (e.g., performed by the domain evaluation module) in the vector representation dictionary, to determine whether or not the respective entry has a learned vector representation (S408). If the respective entry does not have an entry in the vector representation dictionary, this entry is removed from the comparison list C (S409). If, however, the respective entry does have an entry in the vector representation dictionary, then the value of the associated vector representation is added to the comparison list C (S410). The look-up and remove/add processes are run until all entries in the comparison list C have been looked-up in the vector representation dictionary—after which, the modified comparison list is complete.

A single vector is then determined (e.g., determined by the domain evaluation module) as the average of the vector values in the modified comparison list (S411).

The single vector is then evaluated (e.g., evaluated by the domain evaluation module) to determine its distance from the vector representation of the classification label L (S412). If the distance is smaller than a threshold, then the evaluated network data (e.g., the data flows from the associated network entity) are classified (e.g., classified by the domain evaluation module) as matching the label classification (e.g., BAD) (S413). Otherwise the evaluated network data is classified as not belonging to the label classification (e.g., GOOD) (S414).

The method then returns to selecting another RRT list (S404) and proceeds with the next classification (S405-S414).

Figure 5:
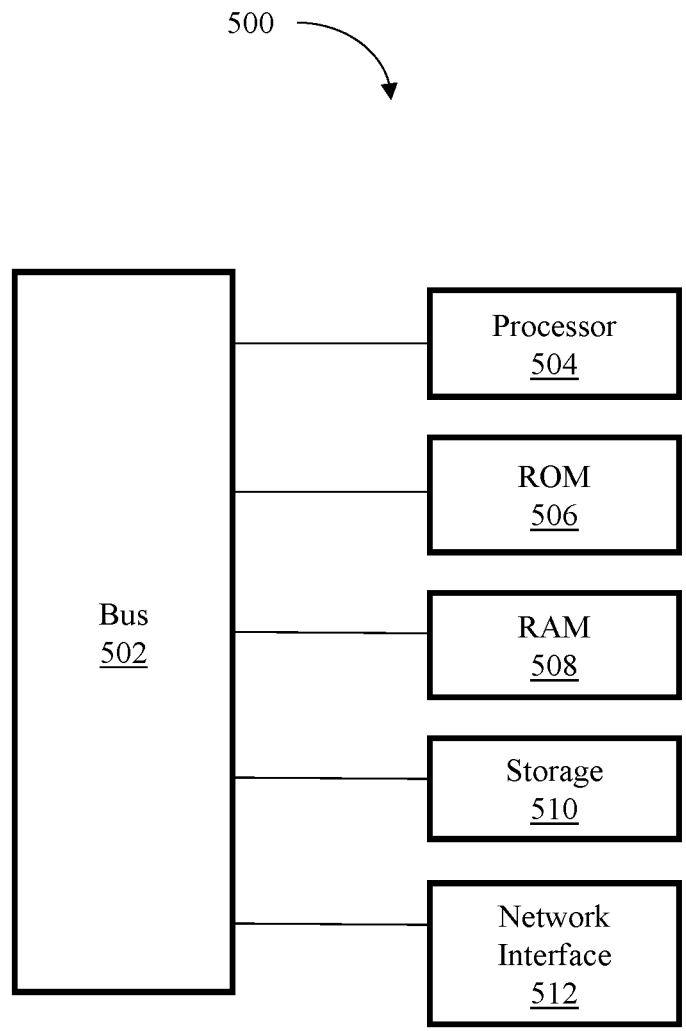
FIG. 5 illustrates a block diagram of a processing system according to an embodiment of the present invention.

FIG. 5 is a block diagram of a processing system according to an embodiment. The processing system 500 is a specialized computer that has been specifically programmed and configured to implement the systems, methods and/or modules described above. The processing system 500 includes a processor 504, such as a central processing unit (CPU) of a computing device or a distributed processor system. The processor 504 executes processor executable instructions comprising embodiments of the system for performing the functions and methods described above. In embodiments, the processor executable instructions are locally stored or remotely stored and accessed from a non-transitory computer readable medium, such as storage 510, which may be a hard drive, cloud storage, flash drive, etc. Read Only Memory (ROM) 506 includes processor executable instructions for initializing the processor 504, while the random-access memory (RAM) 508 is the main memory for loading and processing instructions executed by the processor 504. The network interface 512 may connect to a wired network or cellular network and to a local area network or wide area network, such as the Internet.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for classifying network traffic data, the method comprising:
   selecting a sequence of network destinations from network traffic data that is received online for evaluation to determine whether to classify the sequence of the network destinations with a common classification label, the common classification label corresponding to a common classification class;

determining, online, a list of vector representations for the sequence of the network destinations contained in the network traffic data and a vector representation for the common classification label;

computing a distance between a vector representation for a network domain and the vector representation for the common classification label, the vector representation for the network domain being determined from the list of vector representations corresponding to the sequence of the network destinations of the network traffic data; and classifying the sequence of the network destinations as belonging to the common classification class based on the distance being less than a predefined threshold, wherein the list of vector representations and the vector representation for the common classification label are determined from a vector space model or a vector representation dictionary, the vector space model or the vector representation dictionary being previously generated by an offline machine learning operation.

2. The method of claim 1, the method further comprising outputting a warning based on the sequence of the network destinations being classified as belonging to the common classification class.

3. The method of claim 1, the method further comprising applying a filter to block the sequence of the network destinations' network traffic data based on the sequence of the network destinations being classified as belonging to the common classification class.

4. The method of claim 1, wherein the common classification class groups network destinations in the form of networks domain names.

5. The method of claim 1, wherein the sequence of the network destinations corresponds to a particular network entity.

6. The method of claim 5,
wherein determining the list of vector representations corresponding to the sequence of the network destinations comprises:
generating a comparison list comprising domain name information corresponding to the particular network entity based on the network traffic data;
generating a modified comparison list by inserting a vector representation value for each entry in the comparison list that has a corresponding domain name entry in the vector representation dictionary, the vector representation value being that associated with the corresponding domain name entry; and
generating the list of vector representations by removing entries from the modified comparison list that do not have a corresponding domain name entry in the vector representation dictionary, and
wherein the vector representation for the network domain is determined as an average of vector representations values in the list of vector representations.

7. The method of claim 1, the method further comprising, before determining the vector representation for the network domain, removing from the list of vector representations entries having a corresponding domain name that does not meet a threshold frequency level, the corresponding domain name's frequency being determined from the historical network traffic data.

8. The method of claim 1, the method further comprising generating the vector representation dictionary based on the historical network traffic data and the list of domain names having the common classification class,
wherein entries in the vector representation dictionary each comprises element information and a vector representation, the element information comprising a domain name or the common classification label.

9. The method of claim 8, wherein the vector representation is a set of numeric values that represent a projection of a domain name in a feature space.

10. The method of claim 9, wherein the vector representation is learned with a skip-gram model.

11. The method of claim 8, the method further comprising:
generating a list of unique domain names from the historical network traffic data;
generating a bad domain list based on entries in the list of unique domain names that correspond to entries in a blacklist;
generating a modified list of unique domain names based on replacing each of the domain names in the list of unique domain names that correspond to at least one of the entries in the blacklist with the common classification label; and
learning vector representations for each entry in the modified list of unique domain names, the vector representations comprising the vector representation of the common classification label,
wherein generating the vector representation dictionary comprises:
individually associating each entry in the modified list of unique domain names with a corresponding one of the vector representations; and
individually associating each entry in the bad domain list with the vector representation of the common classification label.

12. A network monitoring system for filtering network traffic data, the network monitoring system comprising one or more processors in communication with a non-transitory processor-readable memory containing instructions, which when executed by the processor cause the network monitoring system to:
select a sequence of network destinations from network traffic data that is received online for evaluation to determine whether to classify the sequence of network destinations with a common classification label, the common classification label corresponding to a common classification class;
determine, online, a list of vector representations for the sequence of the network destinations contained in the network traffic data and a vector representation for the common classification label;
compute a distance between a vector representation for a network domain and the vector representation for the common classification label, the vector representation for the network domain being determined from the list of vector representations corresponding to the sequence of the network destinations of the network traffic data;
classify the sequence of the network destinations as belonging to the common classification class based on the distance being less than a predefined threshold; and
send a classification notification about the sequence of the network destinations,
wherein the list of vector representations and the vector representation for the common classification label are determined from a vector space model or a vector representation dictionary, the vector space model or the vector representation dictionary being previously generated by an offline machine learning operation.

13. The network monitoring system of claim 12, wherein the instructions, when executed by the processor, further cause the network monitoring system to:
  send the classification notification to a network gateway, which routes the network traffic data in a network and filters the network traffic data from the sequence of the network destinations based on the classification notification; and
  receive the network traffic data from a probe in communication with the network gateway, the probe being configured to capture the network traffic data.

14. The network monitoring system of claim 12,
  wherein the sequence of network destinations corresponds to a particular network entity,
  wherein the instructions, when executed by the processor, further cause the network monitoring system to determine the list of vector representations corresponding to the sequence of the network destinations by:
    generating a comparison list comprising domain name information corresponding to the particular network entity based on the network traffic data,
    generating a modified comparison list by inserting a vector representation value for each entry in the comparison list that has a corresponding domain name entry in the vector representation dictionary, the vector representation value being that associated with the corresponding domain name entry, and
    generating the list of vector representations by removing entries from the modified comparison list that do not have a corresponding domain name entry in the vector representation dictionary, and
  wherein the vector representation for the network domain is an average of vector representations values in the list of vector representations.

15. A non-transitory processor-readable storage medium storing instructions that upon execution cause a network monitoring system to perform a method to classify network traffic data, the method comprising:
  selecting a sequence of network destinations from network traffic data that is received online for evaluation to determine whether to classify the sequence of network destinations with a common classification label, the common classification label corresponding to a common classification class;
  determining, online, a list of vector representations for the sequence of the network destinations contained in the network traffic data and a vector representation for the common classification label;
  computing a distance between a vector representation for a network domain and the vector representation for the common classification label, the vector representation for the network domain being determined from the list of vector representations corresponding to the sequence of the network destinations of the network traffic data; and
  classifying the sequence of the network destinations as belonging to the common classification class based on the distance being less than a predefined threshold,
  wherein the list of vector representations and the vector representation for the common classification label are determined from a vector space model or a vector representation dictionary, the vector space model or the vector representation dictionary being previously generated by an offline machine learning operation.

16. The method of claim 1, wherein the vector space model or the vector representation dictionary is stored in a look-up table that associates domain names from a set of domain names with corresponding vector representations from the vector space model or the vector representation dictionary.

17. The method of claim 16, wherein the look-up table includes same vector representation value computed for a common label for all of a substituted set of domain names.

18. The method of claim 1, wherein the vector space model is obtained offline through machine-learning by building a vector representation model based on a set of domain names from a set of historical network traffic data.

19. The method of claim 18, wherein the vector representation model is built by first selecting a subset from the set of domain names based on a list of a predefined class of domain names, the list of domain names being a blacklist with entries of known malicious domains.

20. The method of claim 19, wherein the vector representation model is built by further substituting the selected subset of domain names with a common label to modify the set of domain names, and the modified set of domain names is used to build a model in vector space, the vector space model.

* * * * *